United States Patent
Schoeffel et al.

(10) Patent No.: US 6,189,377 B1
(45) Date of Patent: Feb. 20, 2001

(54) DEVICE FOR MEASURING HYDRAULIC FLOW QUANTITIES AND LEAKS IN A SPECIMEN

(75) Inventors: Eberhard Schoeffel; Klaus Kropf, both of Bamberg; Josef Ernst, Eggolsheim; Josef Seidel, Breitengussbach, all of (DE)

(73) Assignee: Robert Bosch GmbH, Stuttgart (DE)

(*) Notice: Under 35 U.S.C. 154(b), the term of this patent shall be extended for 0 days.

(21) Appl. No.: 09/180,445

(22) PCT Filed: Nov. 27, 1997

(86) PCT No.: PCT/DE97/02772
§ 371 Date: Nov. 6, 1998
§ 102(e) Date: Nov. 6, 1998

(87) PCT Pub. No.: WO98/40700
PCT Pub. Date: Sep. 17, 1998

(30) Foreign Application Priority Data

Mar. 7, 1997 (DE) ................................. 197 09 422

(51) Int. Cl.$^7$ ............................ G01M 15/00; G01M 3/04
(52) U.S. Cl. ............................................ 73/119 A; 73/40
(58) Field of Search .................................. 73/119 A, 40; 123/480, 357; 239/5

(56) References Cited

U.S. PATENT DOCUMENTS

| | | | | |
|---|---|---|---|---|
| 1,939,067 | * | 12/1933 | Legg | 73/724 |
| 2,571,507 | * | 1/1951 | Welch | 315/58 |
| 2,629,255 | * | 1/1953 | Hartridge | 73/119 A |
| 3,880,008 | * | 4/1975 | Eilersen | 73/724 |
| 4,362,052 | * | 12/1982 | Heath et al. | 73/119 A |
| 4,386,522 | * | 6/1983 | Wolff | 73/119 A |
| 5,197,429 | * | 3/1993 | Kita | 123/357 |
| 5,449,114 | * | 9/1995 | Wells et al. | 239/5 |
| 5,553,580 | * | 9/1996 | Ganoung | 123/308 |
| 5,803,983 | * | 9/1998 | Simandl et al. | 134/22.12 |

* cited by examiner

*Primary Examiner*—Hezron Williams
*Assistant Examiner*—Jay L. Politzer
(74) *Attorney, Agent, or Firm*—Ronald E. Greigg; Edwin E. Greigg

(57) ABSTRACT

In order to improve a device for measuring hydraulic flow quantities and leaks in a specimen, including a measurement path, embodied as an approximately vertically extending lead line to the specimen, and a capacitor sensor, which is disposed in the measurement path and can be acted upon both by at least one measuring medium and by at least one medium for generating a pressure (pressure medium) on the measuring medium in such a way that precise measurements of flow quantities and leaks are possible in a technically easily achieved way, the specimen is coupled directly to the measurement path.

20 Claims, 3 Drawing Sheets

DEVICE FOR MEASURING HYDRAULIC FLOW QUANTITIES AND LEAKS IN A SPECIMEN

PRIOR ART

The invention relates to a device for measuring hydraulic flow quantities and leaks in a specimen, including a measurement path, embodied as an approximately vertically extending lead line to the specimen, and a capacitor sensor, which is disposed in the measurement path and can be acted upon both by at least one measuring medium and by at least one medium for generating a pressure (pressure medium) on the measuring medium.

One such device is disclosed in German Patent Disclosure DE 42 05 453 A1, for instance. In this device, the measurement path communicates with the specimen via a branch in which a valve is disposed. A problematic aspect of this device that flow and leakage measurements are possible only with limited accuracy, since because of the branch and in particular the valve disposed in the branch, errors can occur, for instance from leaks in this valve, that adulterate the outcome of measurement.

It is therefore an object of the invention to improve a device for measuring hydraulic flow quantities and leaks in a specimen of this generic type in such a way that precise measurements of flow quantities and leaks are possible in a technically easily realized way.

ADVANTAGES OF THE INVENTION

In a device for measuring hydraulic flow quantities and leaks in a specimen of the type described at the outset, this object is attained according to the invention in that the specimen is coupled directly to the measurement path.

Coupling the specimen directly to the measurement path has the great advantage that on the one hand a very precise measurement is possible, and on the other hand no adulteration of the measurement outcomes, which can be caused for instance by leaking valves disposed between the specimen and the measurement path, can occur.

In particular, the direct coupling of the specimen to the measurement path also makes very fast measurements possible, since measurement delays that adulterate the outcome of measurement and are caused by branches, valves and the like disposed between the specimen and the measurement path, for instance, are precluded.

Purely in principle, the most various dispositions for an inlet/outlet for the pressure medium and for an inlet/outlet for the measurement medium are conceivable.

One advantageous embodiment provides that the inlet/outlet for the pressure medium and the inlet/outlet for the measurement medium are disposed on a side of the measurement path remote from the specimen.

This arrangement on the one hand allows a compact design of the overall measurement device and on the other hand highly precise measurements, since except for the measurement path and the specimen, no other fixtures are disposed in the test circuit.

Another advantageous exemplary embodiment provides that the inlet/outlet for the measurement medium is disposed on the side of the measurement path remote from the specimen, and that the inlet/outlet for the pressure medium is disposed on the side of the measurement path remote from the specimen.

Such an embodiment, in an especially simple way, enables measurement of hydraulic flow quantities and leaks on the trailing side (low-pressure side) of the specimen. It is independent of the operating pressure of the specimen and accordingly can be employed up to arbitrarily high pressures.

Particularly for good coupling of the pressurized measurement medium with the specimen and for easier scavenging of any air bubbles that occur, it is provided in an advantageous exemplary embodiment that a turbulence element for creating a rotary flow in the specimen is disposed between the inlet (the high-pressure side) of the specimen and the measurement path.

With regard to the embodiment of the turboulence element, purely in principle the most various embodiments that generate a rotary flow in the specimen are possible. One advantage embodiment provides that the turbulence element is a cylindrical disk with openings inclined in the axial and azimuth direction. Such a turbulence element is on the one hand especially simple to produce and on the other generates especially effective rotary flows in the specimen.

Preferably, shutoff valves are disposed in the lead lines to the inlets and outlets.

With regard to the embodiment of the measurement path and of the capacitive sensor, no more-detailed specifications have yet been made. An advantageous exemplary embodiment provides that the measurement path takes the form of a cylinder, and that the capacitive sensor is a cylinder capacitor. In this way, the capacitive sensor, which is disposed as a cylinder capacitor in the cylindrical measurement path, can be acted upon in an especially simple way by the measurement medium and the pressure medium, since the measurement path and the capacitive sensor in a sense "coincide".

Purely in principle, the most various fluids can be used as both the measurement medium and the pressure medium.

In one advantageous embodiment, it is provided that the measurement medium is a hydraulic fluid, and that the pressure medium is air.

In another embodiment, which can be used especially advantageously especially at high measurement pressures, it is provided that the measurement medium and the pressure medium are each liquids immiscible with one another.

To avoid short circuits, it is preferably proposed that one of the electrodes of the capacitive sensor is provided with an electrically insulating coating.

Further characteristics and advantages of the invention are the subject of the ensuing description and of the illustrations in the drawings of several exemplary embodiments.

DESCRIPTION OF THE EXEMPLARY EMBODIMENTS

Figure 1:
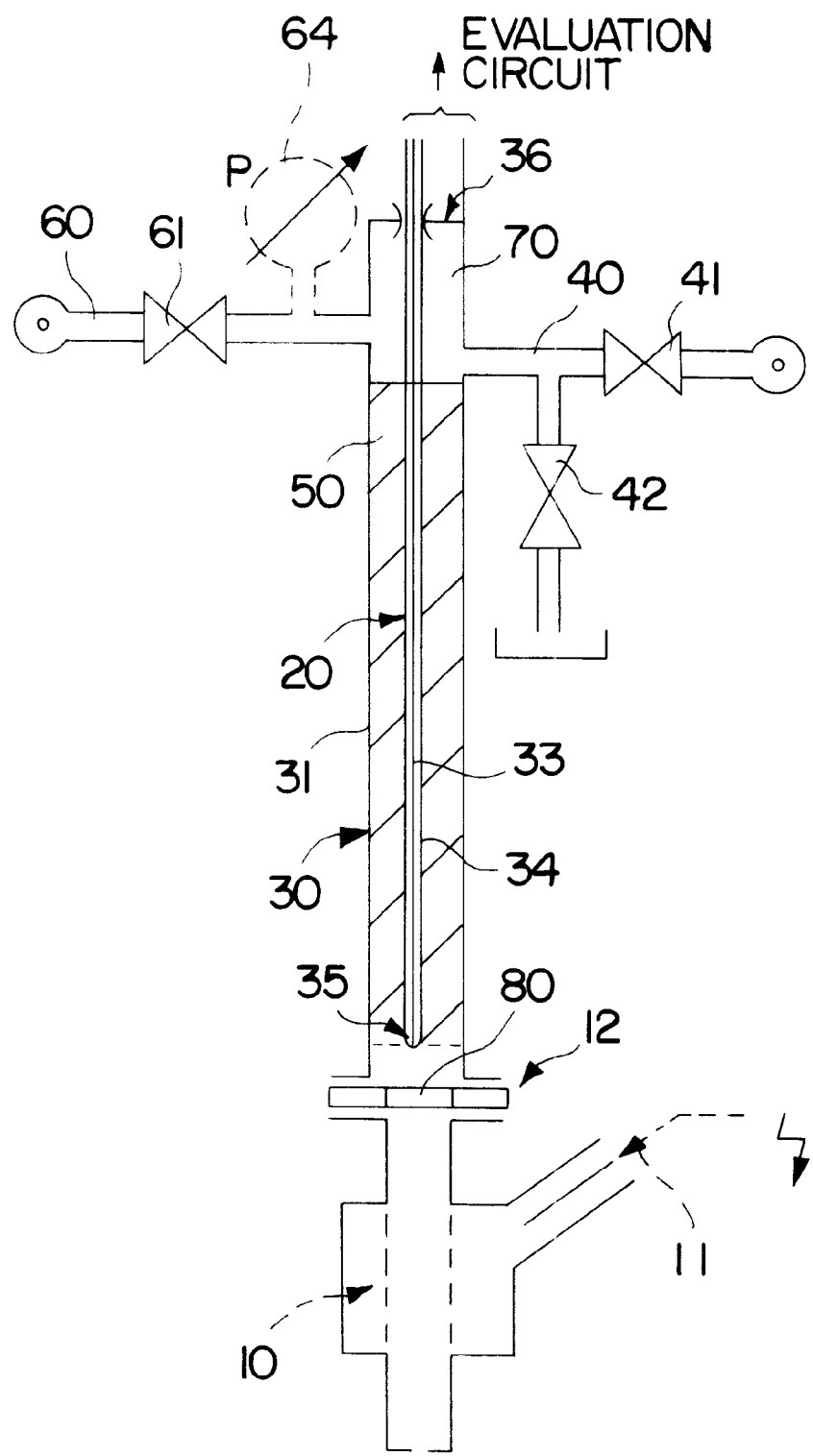
FIG. 1, a first exemplary embodiment of a device according to the invention for measuring hydraulic flow quantities and leaks in a specimen.

One exemplary embodiment of a device for measuring hydraulic flow quantities and leaks in a specimen 10, for instance an injection valve used in automotive engineering, and shown in FIG. 1, includes a measurement path 20, embodied as an approximately vertically extending lead line to the specimen 10, and a capacitive sensor 30 in the form of a cylinder capacitor, disposed in the measurement path 20, whose outer cylinder 31 coincides with the outer tube of the measurement path 20 and whose middle conductor 33 is disposed substantially coaxially in the outer cylinder 31 and thus in the outer tube of the measurement path 20.

The specimen 10 is coupled directly to the measurement path via a sealing element 12.

On the side of the capacitive sensor 30 toward the specimen 10, an electrically insulated, perforated middle conductor fastening 35 is provided.

On the side of the capacitive sensor 30 remote from the specimen 10, the middle conductor 33 is passed to the outside to the evaluation circuit, via an electrically insulating, pressure-tight leadthrough 36.

On the side of the measurement path 20 remote from the specimen 10, an inlet/outlet 40 for a measurement medium 50 is provided, by way of which the measurement path 20 and thus the capacitive sensor 30 in the form of the cylinder capacitor can be acted upon by the measurement medium 50.

The inlet/outlet 40 of the measurement medium 50 can be closed via a first valve 41 and a second relief or return valve 42.

Also provided on the side of the measurement path 20 remote from the specimen 10 is an inlet/outlet 60, by way of which a medium, that is, a pressure medium 70, for generating a pressure on the measurement medium 50 can be delivered to the measurement path 20. The inlet/outlet 60 for the pressure medium 70 can be closed via a valve 61. Furthermore, a manometer 64 for measuring the pressure prevailing in the measurement path 20 may be provided in the inlet/outlet 60 for the pressure medium 70, downstream of the valve 61.

A turbulence element 80 for generating a rotary flow in the specimen 10 is also disposed between the specimen 10 and the measurement path 20 and thus the capacitive sensor 30. By means of this rotary flow, in particular bubbles or the like, which can occur upon imposition of the measurement medium 50 on the specimen 10, are scavenged from the measurement medium 50 and the specimen 10. The turbulence element takes the form of a cylindrical disk with openings (not shown) inclined in the axial and azimuth direction.

In the device shown in FIG. 1, which is highly suitable for measuring hydraulic intactness, a hydraulic fluid is preferably used as the measurement medium, and air as the pressure medium. The middle conductor 33 has a diameter of approximately 0.5 mm, while conversely the outer cylinder 30 has a diameter of about 2 mm. The length of the cylinder capacitor is about 100 mm.

If the measurement medium 50 is electrically conductive, then the middle conductor 33 is provided with a thin, homogeneous electrically insulating coating 34.

Such a device is especially advantageous for measuring slight flows, since only the sealing element 12 for coupling the specimen is located in the test circuit, and thus no disturbances that could be caused for instance by leaks from fixtures disposed between the measurement path 20 and the specimen 10 can occur.

For measurement, first the measurement medium 50 is introduced via the inlet/outlet 40, with the valve 41 open and the valves 42 and 61 closed, into the measurement path 20 and the specimen 10. The specimen 10 is opened and closed in pulsed fashion for scavenging via a trigger line 11. As a result of this scavenging operation, the entire measurement path 20 and the specimen 10 is flooded with the measurement medium 50.

The valves 61 and 42 are thereupon opened, and the upper region of the measurement path 20 is blown out and dried by blown in an air stream, that is, the pressure medium 70. The outlet bore of the inlet/outlet 40 of the measurement medium 50 is advantageously disposed below the inlet/outlet bore of the inlet/outlet 60 of the pressure medium, so that any measurement medium 50 present in the measurement path 20 can flow out via the inlet/outlet 40 for the measurement medium 50.

For measurement, the valves 41, 42 in the inlet/outlet 40 of the measurement medium 50 are closed, while the valve 61 in the inlet/outlet 60 of the pressure medium 70 is opened. In this way, the measurement path 20 and the capacitive sensor 30 are acted upon by a test pressure p, which can be detected by the manometer 64.

To measure the quantity of fluid ejected by the specimen 10, the level of the measurement medium 50 is detected by the capacitive sensor 30 and sent to an evaluation circuit to be described in further detail hereinafter.

The specimen 10 is thereupon opened in controlled fashion via a control line 11, and the level of the measurement medium 50 is detected again by the capacitive sensor 30.

The change in level in the measurement path 20 and thus in the capacitive sensor 30 in the form of the cylinder capacitor is a measure for the flow quantity in the specimen 10.

To determine a leak or a continuous flow in the specimen 10, the level in the measurement path 30 is detected by the capacitive sensor 30 at two successive instants. The change in level in the period between the two instants is a measure for the leakage or the continuous flow.

Figure 2:
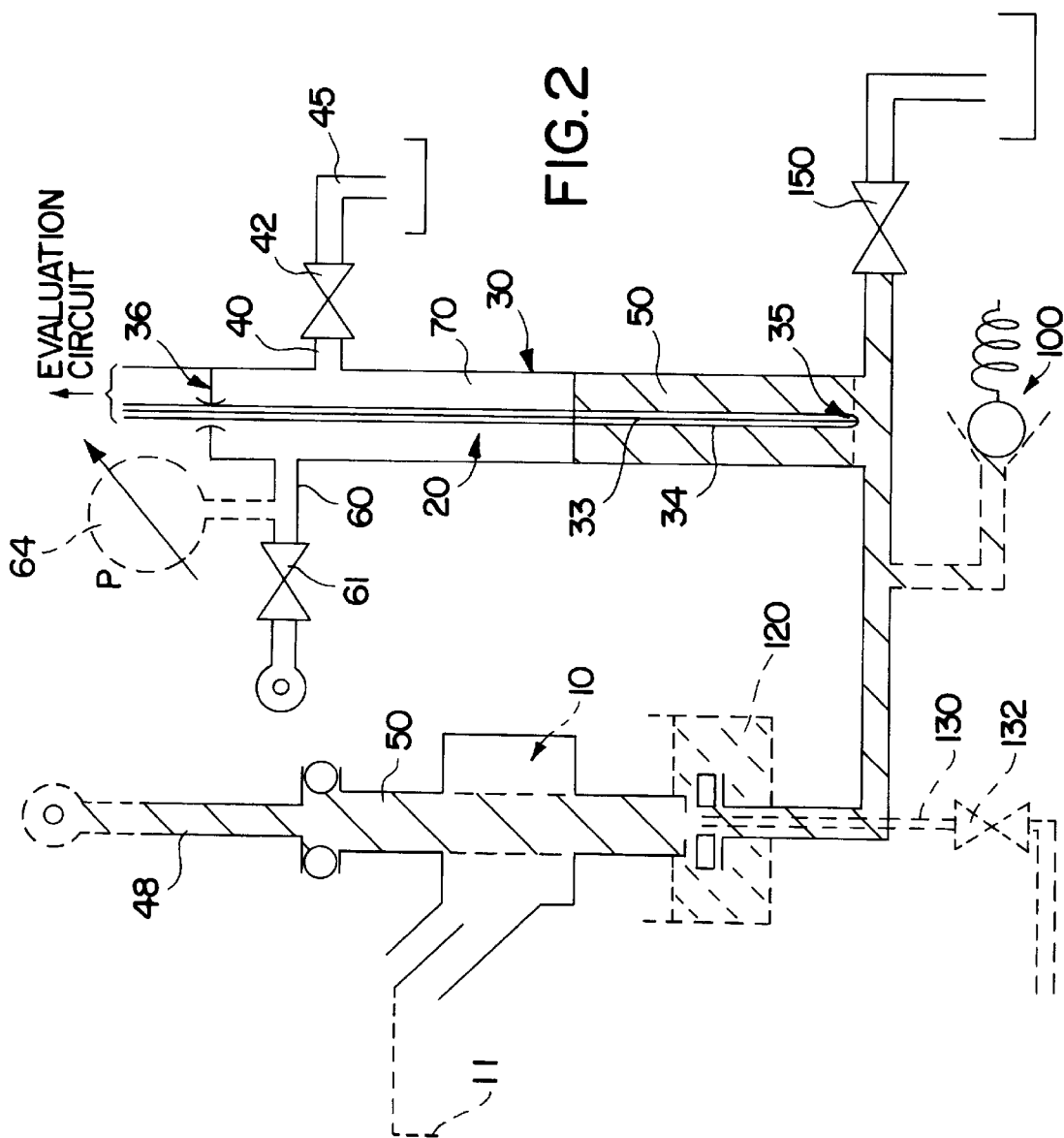
FIG. 2, a second exemplary embodiment of a device according to the invention for measuring hydraulic flow quantities and leaks in a specimen.

Another exemplary embodiment of a device for measuring hydraulic flows and leaks, shown in FIG. 2, differs from the device shown in FIG. 1 in that an inlet/outlet 48 for the measurement medium 50 is disposed directly on the specimen 10, on its side remote from the measurement path 20.

The inlet/outlet 40 is disposed on the inlet side, that is, the high-pressure side of the specimen 10, while the specimen 10 is coupled via its outlet or in other words low-pressure side directly to the measurement path 20. This device is independent of the operating pressure of the specimen 10 and can accordingly be used up to arbitrarily high pressures.

As shown in FIG. 2, a safety valve 100 is provided, which at very high operating pressures of the specimen 10 prevents destructive or dangerous pressures from arising in the measurement path 20, as happens for instance if the specimen 10 no longer closes or leaks extremely badly.

The measurement is done by imposing a very high pressure (100 to 150 bar) on the high-pressure side of the specimen 10. If the specimen 10 leaks, or to measure flow quantities, a volumetric increase in the low-pressure side, which is coupled directly to the measurement path 20, is brought about as a result. This causes a shift in the liquid level of the liquid measurement medium 50 in the measurement path 20, which is detected by the capacitive sensor 30 and thus in the present case by the cylinder capacitor. The pressure prevailing in the pressure medium 70 in this case is equivalent to atmospheric pressure. The valve 61 is closed, while the return valve 42 is conversely open.

As shown in dashed lines in FIG. 2, the specimen 10 may also be coupled to the measurement path 20 via a medium 120, which is advantageously equivalent to the measurement medium 50. In this way, particularly upon coupling, air inclusion can be prevented. Furthermore, a line 130 and a valve 132 for scavenging the specimen can be provided, which allows scavenging the specimen 10 with the measurement medium 50 prior to the actual measurement.

A relief line 130 is used to adjust the fill level in the measurement path 20.

Figure 3:
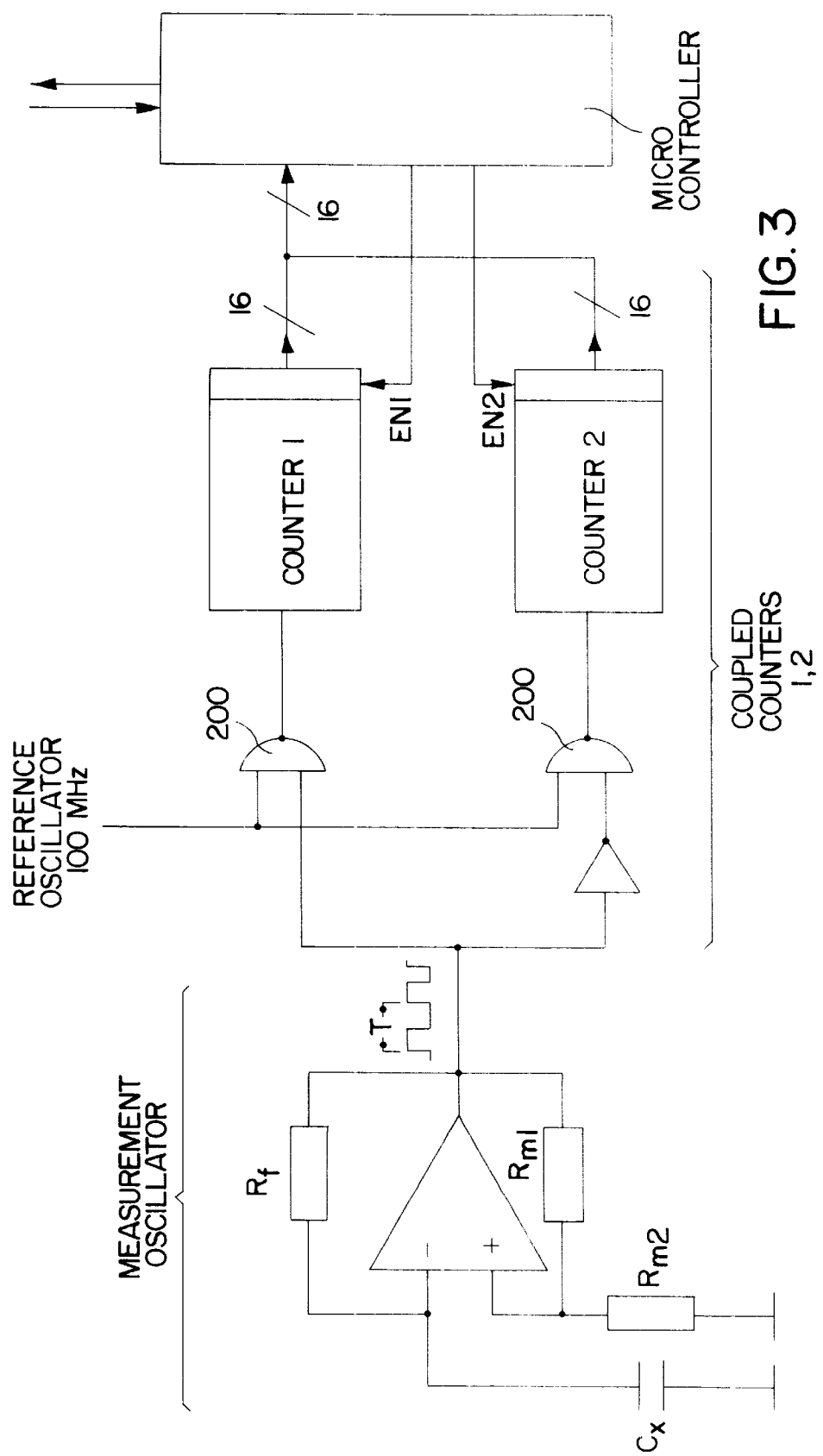
FIG. 3, a basic circuit diagram of an evaluation circuit that can be used in the devices of the invention, shown in FIG. 1 and FIG. 2, for measuring hydraulic flow quantities and leaks.

The measurement of the capacity of the capacitive sensor 30 disposed in the measurement path 20 is done as schematically shown in FIG. 3. The capacitive sensor Cx is, together with positive and regenerative feedback resistors Rf, Rm1, Rm2, a frequency-determining element of a measuring oscillator (square wave generator) known per se. The resultant period length T of the oscillator is directly proportional to Cx. With a capacitance Cx of about 20 pF, a positive feedback resistance Rf=5 MΩ, and regenerative feedback resistances Rm1, Rm2=230 kΩ, T for instance becomes 230 $\mu$s, that is, an oscillator frequency f of about 4.3 kHz. The measuring oscillator signal, corresponding to the sensor capacitance, is delivered to two counter chains, each including one counter 1 and one counter 2, in which the signal delivered to one counter 2 is inverted. A respective NAND gate 200 with two inputs precedes each of the counter chains. To one of each of the pairs of inputs, a common 100 MHz signal of a reference oscillator is applied, which is generated via a quartz oscillator component known per se. The NAND gate of the counter 1 allows the 100 MHz signal to pass, during the time while the output of the measuring oscillator is at HIGH. Since the measuring oscillator signal used for the counter 2 is inverted, the NAND gate of the counter 2 allows the 100 MHz signal to pass during the LOW phase of the measuring oscillator signal.

The counters 1, 2 of the two counter chains are each 16-bit counters. A microcontroller reads out the counter states in succession.

Any difference from the readout in a previous measuring oscillator period is ascertained. This yields the length of the respective half (HIGH/LOW) of the measuring oscillator period in 10-ns units (100 MHz reference frequency). Adding the respectively other half-period, measured previously, after measurement of each half-period yields the instantaneous total measuring oscillator period T in 10-ns units. For the aforementioned time constant T=230 $\mu$s, the period is accordingly approximately 23,000. By this type of internested readout of the counter chains, a very high chronological resolution is obtained (typically, about 120 $\mu$s). In this way, very fast measurements are possible, which in particular can be carried out especially well from a measurement technology standpoint with the device described above in conjunction with FIG. 1.

For the measurement, a given number of measured values is processed in a test bench computer (not shown). By the preselectable number of such measurements, a calibration curve is then laid out, with a constant, time-proportional and exponentially fading term, by the following formula:

measured value=constant+leakage*$t$+$K$*exp ($-t/to$).

The exponentially fading term takes into account effects generated in particular by entrapped air in the specimen 10 (adiabatic heating upon imposition of the scavenging/test pressure and ensuing reduction of volume by cooling). The time constant to is dependent substantially only on the specimen 10 used, such as a family of injection valves, and can therefore be determined with general validity. The variable K is a measure for the volume of the trapped air and can be monitored.

For slow measurements, typically 80 measuring oscillator periods are read out per detection of a measured value. When the last 10 measurements at intervals typically of 50 to 200 $\mu$s are averaged, the resultant measured value is approximately 18 million, for a well-filled sensor. For an empty sensor, this figure is approximately 15 million. Thus, the degree of filling of the sensor can also be detected, that is, a detection of disturbances in the supply of measurement medium 50, a detection of a large leak in the specimen 10, excessive air inclusion, and the like.

It is understood that standard, slow measurements, such as tests for tightness or integral measurements of dynamic or static flows, are also possible by suitable measuring programs, which are stored in the microcontroller. Because of the possibility of a fast measurement, many measurements can be added together and their average, optionally weighted, can be determined.

The foregoing relates to a preferred exemplary embodiment of the invention, it being understood that other variants and embodiments thereof are possible within the spirit and scope of the invention, the latter being defined by the appended claims.

What is claimed is:

1. A device for measuring hydraulic flow quantities and leak quantities in a specimen (10), including a measurement path (20), embodied as an approximately vertically extending lead line to the specimen (10), a capacitor sensor (30), which is disposed in the measurement path (20) and is acted upon both by at least one measurement medium (50) and by at least one pressure medium (70) for generating a pressure on the measurement medium (50), the specimen (10) is coupled directly to the measurement path (20), said capacitor sensor (30) detects a change in a level of the measurement medium (50) in the measurement path (20), which change in the level of the measurement medium (50) is a measure for the fluid flow quantity or the leak quantity.

2. A device according to claim 1, in which an inlet/outlet (60) for the pressure medium (70) and an inlet/outlet (40) for the measurement medium (50) are disposed on a side of the measurement path (20) remote from the specimen (10).

3. A device according to claim 1, in which an inlet/outlet (48) for the measurement medium (50) is disposed on the specimen (10) on a side remote from the measurement path (20), and that the inlet/outlet (60) for the pressure medium (70) is disposed on the side of the measurement path (20) remote from the specimen (10).

4. A device according to claim 1, in which a turbulence element (80) for creating a rotary flow in the specimen (10) is disposed between the inlet of the specimen (10) and the measurement path (20).

5. A device according to claim 2, in which a turbulence element (80) for creating a rotary flow in the specimen (10) is disposed between the inlet of the specimen (10) and the measurement path (20).

6. A device according to claim 4, in which the turbulence element (80) is a cylindrical disk with openings inclined in the axial and azimuth direction.

7. A device according to claim 5, in which the turbulence element (80) is a cylindrical disk with openings inclined in the axial and azimuth direction.

8. A device according to claim 1, in which shutoff valves (41, 42, 61) are disposed in the lead lines to the inlets and outlets (40, 60).

9. A device according to claim 1, in which the measurement path (20) takes the form of a cylinder, and that the capacitive sensor (30) is a cylinder capacitor.

10. A device according to claim 1, in which the measurement medium (50) is a hydraulic fluid, and that the pressure medium (70) is air.

11. A device according to claim 2, in which the measurement medium (50) is a hydraulic fluid, and that the pressure medium (70) is air.

12. A device according to claim 3, in which the measurement medium (50) is a hydraulic fluid, and that the pressure medium (70) is air.

13. A device according to claim 4, in which the measurement medium (50) is a hydraulic fluid, and that the pressure medium (70) is air.

14. A device according to claim 1, in which the measurement medium (50) and the pressure medium (70) are each liquids that are immiscible with one another.

15. A device according to claim 2, in which the measurement medium (50) and the pressure medium (70) are each liquids that are immiscible with one another.

16. A device according to claim 3, in which the measurement medium (50) and the pressure medium (70) are each liquids that are immiscible with one another.

17. A device according to claim 4, in which the measurement medium (50) and the pressure medium (70) are each liquids that are immiscible with one another.

18. A device according to claim 1, in which one of the electrodes of the capacitive sensor (30) is provided with an electrically insulating coating (34).

19. A device according to claim 2, in which one of the electrodes of the capacitive sensor (30) is provided with an electrically insulating coating (34).

20. A device according to claim 3, in which one of the electrodes of the capacitive sensor (30) is provided with an electrically insulating coating (34).

* * * * *